United States Patent
Thompson et al.

(10) Patent No.: US 6,370,894 B1
(45) Date of Patent: Apr. 16, 2002

(54) METHOD AND APPARATUS FOR USING SINGLE-STAGE THERMOSTAT TO CONTROL TWO-STAGE COOLING SYSTEM

(75) Inventors: Kevin D. Thompson, Indianapolis; Paul Kiningham, Roanoke; Dave Tumbusch, Ft. Wayne, all of IN (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/802,578

(22) Filed: Mar. 8, 2001

(51) Int. Cl.[7] .......................... G05D 23/32; F25B 19/00
(52) U.S. Cl. ........................ 62/158; 62/231; 236/1 EA
(58) Field of Search ................. 62/231, 158, 175; 236/1 EA

(56) References Cited

U.S. PATENT DOCUMENTS

| | | | | |
|---|---|---|---|---|
| 4,325,224 A | * | 4/1982 | Howland | 62/196 A |
| 4,338,791 A | * | 7/1982 | Stamp et al. | 62/160 |
| 4,903,502 A | * | 2/1990 | Hanson et al. | 62/228.5 |
| 6,058,729 A | * | 5/2000 | Lifson et al. | 62/217 |

* cited by examiner

Primary Examiner—William C. Doerrler
(74) Attorney, Agent, or Firm—Wall Marjama & Bilinski LLP

(57) ABSTRACT

When a single-stage thermostat is appropriately connected to a two-stage cooling system, a microprocessor control activates low and high stages of cooling based on preset parameters. The cooling load requirement is determined and compared to the maximum load requirement that can be satisfied in low-stage cooling mode and the minimum load requirement which can be satisfied in high-stage cooling mode. The desired low-stage cooling time limit is then determined for the next cycle. After the first cycle, the desired low-stage cooling time limit may be equal to zero in which case the next cycle is spent in high-stage cooling mode, or, if greater than zero, the next cycle runs in low-stage cooling mode up to the desired low-stage cooling time limit, with an additional high-stage cooling mode run if the thermostat is not satisfied within the desired time.

23 Claims, 3 Drawing Sheets ltd # METHOD AND APPARATUS FOR USING SINGLE-STAGE THERMOSTAT TO CONTROL TWO-STAGE COOLING SYSTEM

FIELD OF THE INVENTION

The present invention pertains to the field of cooling systems, and in particular, to a microprocessor control system that provides single stage thermostat control for a two-stage cooling system.

BACKGROUND OF THE INVENTION

Many air conditioner controls include a two-stage thermostat for providing dual stage cooling, wherein the first stage of the thermostat operates the unit on low cooling and the second stage of the thermostat operates the unit on high cooling. For example, a typical two-stage thermostat includes two small mercury bulb contacts on a bi-metal sensor that close and open as a function of the movement of the bi-metal sensor in response to changing room temperatures. If the present room temperature is above a desired temperature set point, for example, one degree to two degrees above the set point, then the first mercury bulb contact closes to provide low stage cooling. If the room temperature continues to rise to, for example, three degrees above the desired temperature set point, then the second mercury bulb contact closes to provide a high stage cooling. When the cooling load is satisfied, both of the mercury bulb contacts in the thermostat sequentially open or deactivate, thereby terminating the cooling cycle. Thereafter, when the thermostat contacts close indicating a new cooling load to be satisfied, the air conditioning control repeats the same identical cooling cycle.

Disadvantages of this type of air conditioning control include the requirement for a two-stage thermostat for providing dual rates of cooling and the existence of large swings in room temperature.

SUMMARY OF THE INVENTION

Briefly stated, when a single-stage thermostat is appropriately connected to a two-stage cooling system, a microprocessor control activates low and high stages of cooling based on preset parameters. The cooling load requirement is determined and compared to the maximum load requirement that can be satisfied in low-stage cooling mode and the minimum load requirement which can be satisfied in high-stage cooling mode. The desired low-stage cooling time limit is then determined for the next cycle. After the first cycle, the desired low-stage cooling time limit may be equal to zero in which case the next cycle is spent in high-stage cooling mode, or, if greater than zero, the next cycle runs in low-stage cooling mode up to the desired low-stage cooling time limit, with an additional high-stage cooling mode run if the thermostat is not satisfied within the desired time.

According to an embodiment of the invention, a method for selectively providing a low cooling mode and a high cooling mode of a cooling cycle in an air conditioning unit as a function of a previous cooling cycle includes storing a previous duration of operation of a low cooling mode and a previous duration of operation of a high cooling mode of a previous cooling cycle; determining an existence of a cooling load to be satisfied; recalling the stored duration of the previous low cooling mode; providing a low cooling mode for a selected first time period dependent upon the stored duration of the previous low cooling mode; and terminating the low cooling mode if the cooling load is satisfied during the selected first time period.

According to an embodiment of the invention, a method for selectively providing a low cooling mode and a high cooling mode of a cooling cycle in an air conditioning unit as a function of a previous cooling cycle includes storing the duration of a previous cooling cycle; determining the existence of a cooling load to be satisfied; recalling the stored duration of the previous cooling cycle; providing a low cooling mode for a selected first time period dependent upon the time duration of the previous cooling cycle and the determination of the existing cooling load to be satisfied; and terminating the low cooling mode if the cooling load is satisfied during the selected first time period.

According to an embodiment of the invention, an adaptive control system for providing a low cooling mode and a high cooling mode of a cooling cycle in an air conditioning unit as a function of a previous cooling cycle includes means for storing a previous duration of operation of a low cooling mode and a previous duration of operation of a high cooling mode of a previous cooling cycle; means for determining the existence of a cooling load to be satisfied; means for recalling the stored duration of the previous low cooling mode; means for providing a low cooling mode for a selected first time period dependent upon the stored duration of the previous low cooling mode; and means for terminating the low cooling mode if the cooling load is satisfied during the selected first time period.

According to an embodiment of the invention, an adaptive control system for providing a low cooling mode and a high cooling mode of a cooling cycle in a furnace as a function of a previous cooling cycle includes means for storing the duration of a previous cooling cycle; means for determining the existence of a cooling load to be satisfied; means for recalling the stored duration of the previous cooling cycle; means for providing a low cooling mode for a selected first time period dependent upon the duration of the previous cooling cycle and the determination of the existing cooling load to be satisfied; and means for terminating the low cooling mode if the cooling load is satisfied during the selected first time period.

According to an embodiment of the invention, a method for providing a low cooling mode and a high cooling mode of a cooling cycle in a current cycle of an air conditioner unit as a function of the previous cooling cycle wherein the current cooling cycle is a function exclusively of time run in the low cooling mode and time run in the high cooling mode of the previous cooling cycle includes the steps of (a) determining an existence of a cooling load to be satisfied; (b) running the unit in the low cooling mode for a first time interval that does not exceed a predetermined limit; (c) running the unit in the high cooling mode for a second time interval until the cooling load is satisfied; (d) calculating a cooling load requirement as a function of the first time interval and the second time interval; and (e) predetermining the low cooling mode time limit for a next cycle from the calculated cooling load requirement.

DETAILED DESCRIPTION OF THE PREFERRED EMBODIMENT

Figure 1:
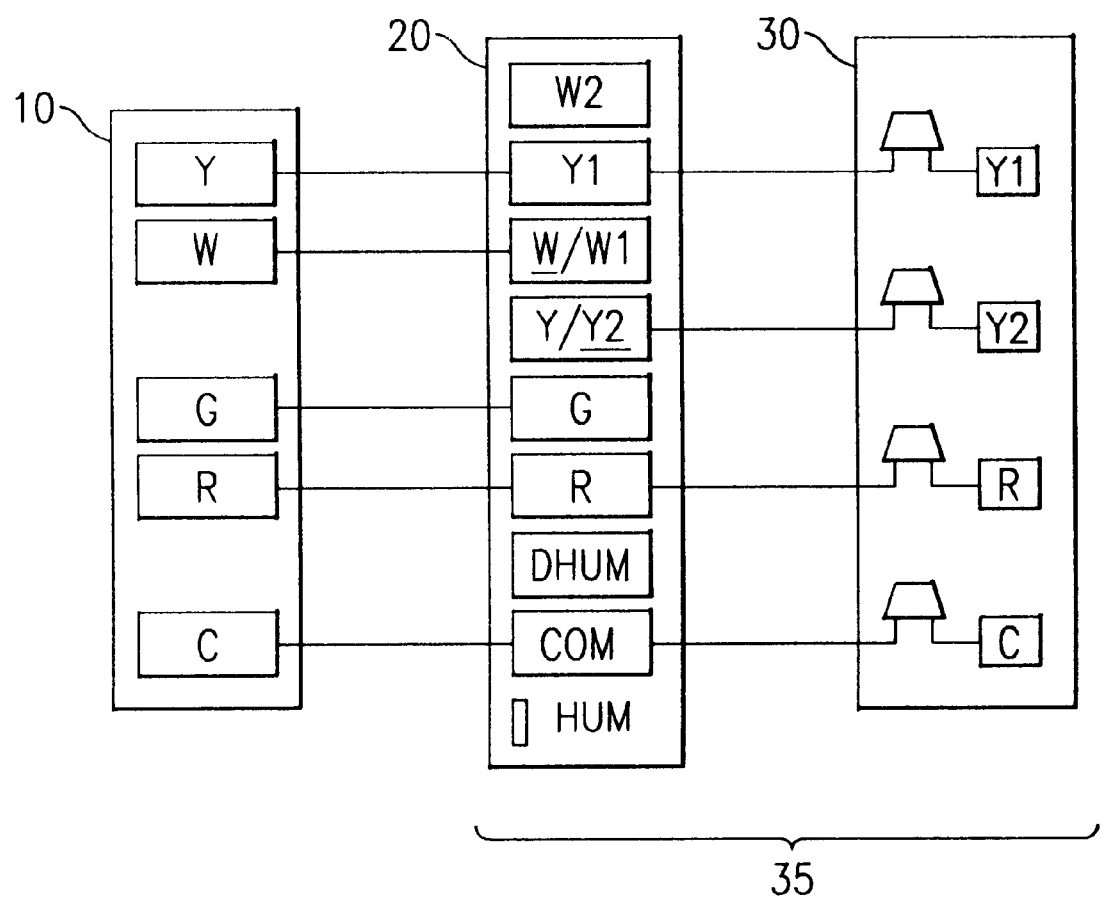
FIG. 1 shows a single-stage thermostat connected to a two-stage furnace unit and a two-stage air conditioning unit as used with an embodiment of the present invention.

Referring to FIG. 1, a single-stage thermostat 10 is shown in relation to a furnace unit 20 and an air conditioning unit 30. Units 20 and 30 are collectively referred to as system 35. This depiction shows the common case where the air conditioning unit uses the blower motor from the furnace unit to send cooled air throughout a structure such as a house or office building. Furnace unit 20 and air conditioning unit 30 are shown as two-stage units. The wire connections are shown, following the conventional system of using "Y" to label the yellow wire used for cooling, "W" to label the white wire used for heating, "G" to label the green wire used for continuous fan, "R" to label the red wire used for 24 VAC, and "C" to label the black wire used for the common, or ground.

In the two-stage furnace unit 20, additional connections are shown which are designed for connection to a two-stage thermostat, namely, W2, W/W1, Y1, and Y/Y2. In this invention, single-stage thermostat 10 has its W wire connected to the W/W1 terminal and its Y wire connected to the Y1 terminal. The wiring between the two-stage furnace unit 20 and the two-stage air conditioner 30 is shown, with Y1 of unit 20 connected to Y1 of unit 30 and Y2 of unit 20 connected to Y2 of unit 30.

Figure 2:
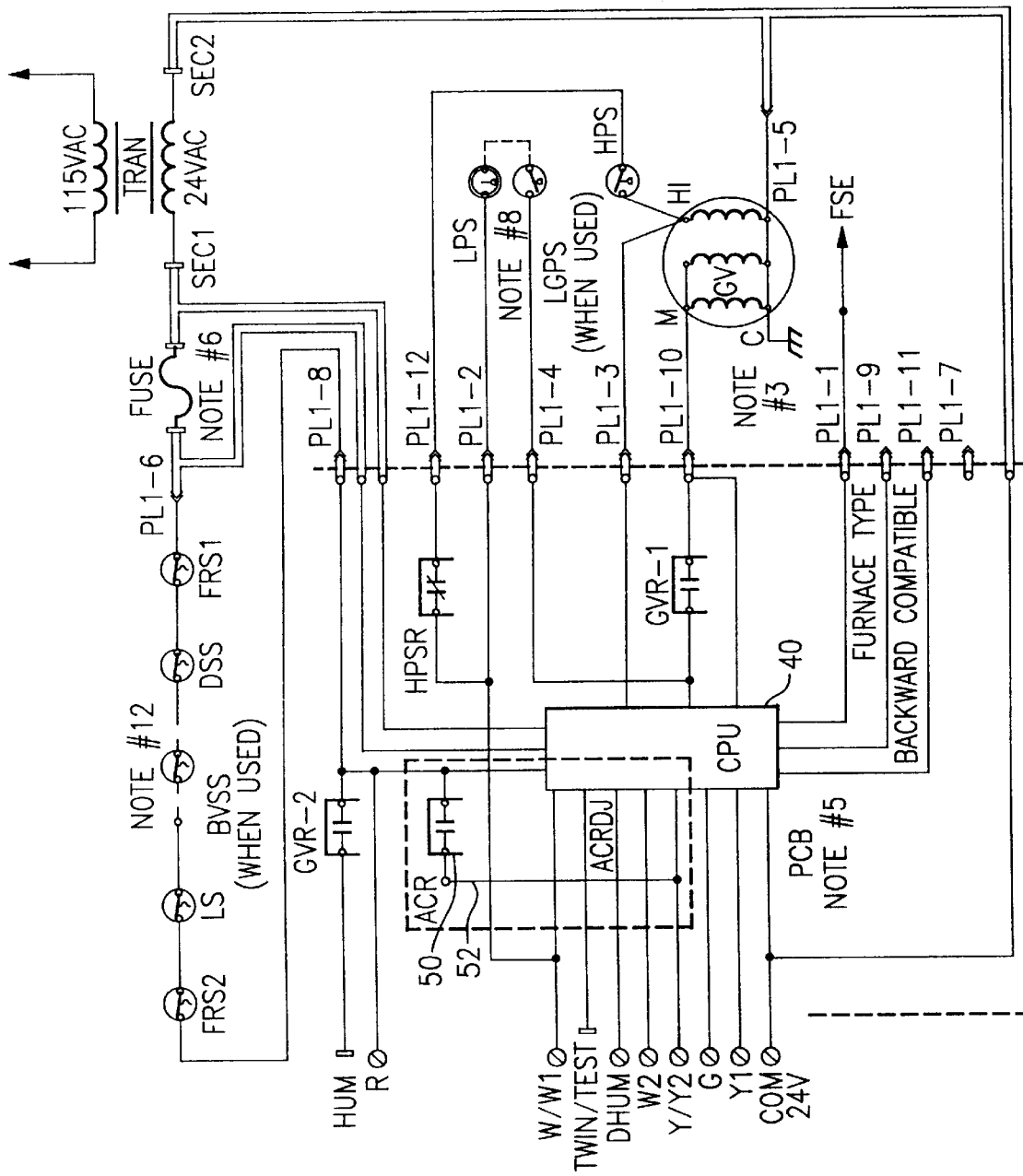
FIG. 2 shows a portion of a furnace control ladder diagram used in explaining an embodiment of the present invention.

Referring to FIG. 2, the 24 VAC control portion of two-stage furnace unit 20 is shown. A microprocessor such as CPU 40 provides adaptive high-stage cooling operation with two-stage cooling units when a conventional single-stage heat/cool thermostat 10 energizes the Y1 thermostat terminal. An air conditioning relay (ACR) 50 is connected to Y/Y2 to initiate the high cooling mode. A two-pin shunt jumper 52 is preferably provided to disable the ACR 50 output when a two-stage cooling thermostat is to be used in place of a single-stage thermostat. ACR 50 is optionally located within air conditioning unit 30.

When CPU 40 senses that the Y/Y2 terminal is energized in combination with the G or Y1 terminal, the blower motor is turned on at high-stage cooling speed after a short wait, preferably about three seconds. When thermostat 10 opens, CPU 40 delays turning off the blower motor for about 90 seconds, +/− one second. If a dehumidify command is active, the cooling blower off-delay is preferably aborted. When CPU 40 senses that the Y1 terminal is energized in combination with the G terminal, the blower motor is turned on at low-stage cooling speed after a short wait of preferably about three seconds. When thermostat 10 opens, CPU 40 delays turning off the blower motor for about 90 seconds, +/− one second. If a dehumidify command is active, the cooling blower off-delay is preferably aborted. In addition, CPU 40 modifies the behavior of the two-stage cooling system on the next cooling cycle based on the length of the previous on cycle.

In particular, CPU 40 causes system 35 to start up in high-stage cooling mode only if the Y1 and Y/Y2 inputs are ON. Otherwise, system 35 always starts up in low-stage cooling mode, i.e., when only terminal Y1 is energized. On the initial cycle, if the thermostat is not satisfied at the end of a low-stage cooling time limit, ACR 50 is activated which energizes the Y/Y2 terminal, thus forcing system 35 to switch to high-stage cooling mode until the thermostat is satisfied. CPU 40 keeps track of the time of operation in the low-stage cooling (LCT) mode and high-stage cooling (HCT) mode. These times are used to determine the cooling load requirement (CLR) to satisfy a call for cooling from thermostat 10. HCT is the high-stage cooling time of the previous cycle.

The initial low-stage cooling time limit is determined from experience, and is preferably set at around 20 minutes for current furnace/air conditioning models.

Figure 3:
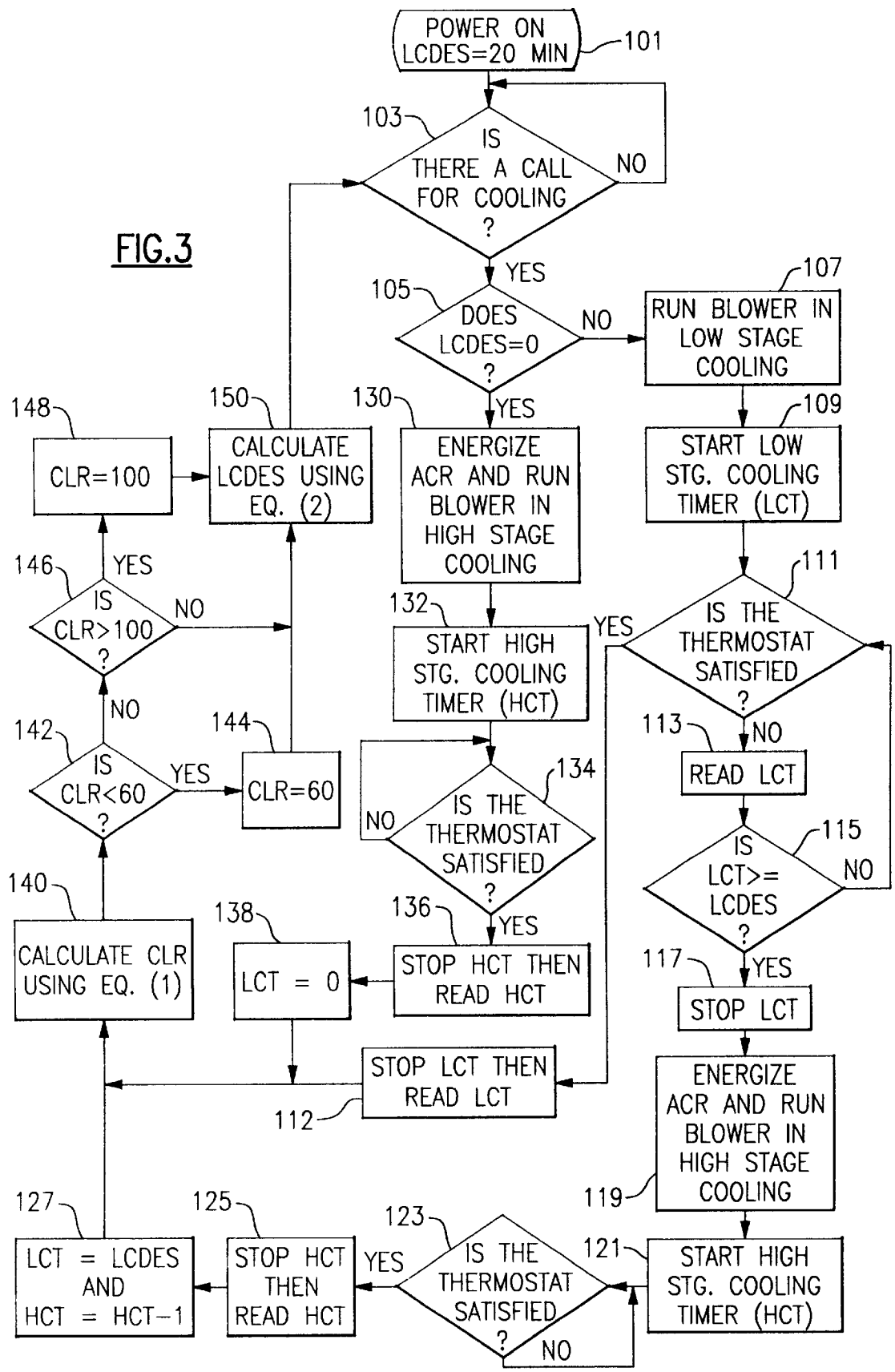
FIG. 3 shows a flowchart showing the process control of an embodiment of the present invention.

Referring to FIG. 3, step 101 represents the powering on of the unit whereupon the value of the low-stage cooling time limit (LCdes), in the initial cycle, is initialized to twenty (20) minutes. The following step, 103 represents thermostat 10 sensing whether or not there is a cooling load to be satisfied. If there is such a load, the thermostat's single stage contact is closed and a signal is generated to microprocessor control 40 indicating a need for cooling. This test is performed repeatedly until such time as a call for cooling is generated. When a call for cooling is recognized, the system proceeds to step 105, where microprocessor 40 determines whether or not LCdes is equal to zero, which is equivalent to asking whether a period in low cooling mode is required. In the initial cycle, LCdes is set to twenty, so a low cooling mode period is ensured upon power-up, beginning at step 107.

Similarly if, in subsequent cycles, a period of low cooling mode is required, then in step 107 the low cooling mode of air conditioner 30 begins. Microprocessor 40 then initiates the running of the low-stage cooling timer (LCT) at step 109. At the next step 111, thermostat 10 is queried to determine whether or not the demand for cooling is satisfied. If the demand for cooling is not satisfied, then the LCT is read at step 113, after which microprocessor 40 at step 115 determines whether or not LCT is greater than or equal to the desired low-stage cooling time limit LCdes. If the value of LCT does not exceed or equal LCdes, then the control system loops back to step 111.

On the other hand, if LCT is greater than or equal to LCdes, then the low-stage cooling timer is stopped in step 117, and in step 119, the air conditioning relay (ACR) is energized and the blower begins running in high-stage cooling mode. The highstage cooling timer (read into variable HCT) is started at step 121, and in the following step 123, thermostat 10 is repeatedly queried to see whether or not the cooling demand is satisfied. When the cooling demand is satisfied, the high-stage cooling timer is stopped and read in step 125, thereby obtaining the time interval measurement for the high-stage cooling mode. In step 127, the value of LCdes is set to the value of the low-stage cooling timer and HCT is set to HCT minus 1. This is due to the fact that the system cannot switch directly from low-stage cooling to high-stage cooling, but requires a one-minute stop time after the ACR is energized. Subtracting "1" from HCT in step 127 takes this into account. For a system without a one minute stop time, the value for HCT does not need adjusting. Calculations are then performed in step 140 as are described below.

Returning now to step 111 at which thermostat 10 is queried after running in low-stage cooling mode, if the cooling demand is satisfied after the system has operated only in low-stage cooling mode, then in step 112 the low-stage cooling timer is stopped and read, after which calculations are performed in step 140 as described below.

Returning now to step 105, if LCdes is equal to zero, then no initial low-stage cooling mode run is desired. Therefore, in the following step 130, the ACR is energized and the blower is run in high-stage cooling mode. The high-stage cooling timer is then started in step 132. In the following step 134, thermostat 10 is repeatedly queried to see if the cooling requirement is satisfied. When the cooling requirement is satisfied, the high-stage cooling timer is stopped and read in step 136. The LCT is zero in step 138, as no time was spent in low-stage cooling mode. Calculations as indicated in step 140 are then performed.

In the first step of the calculation process, step 140, the cooling load requirement (CLR) to satisfy a call for cooling is calculated by the following equation:

$$CLR = (3 \times LCT) + (5 \times HCT) \qquad \text{Equation 1,}$$

where 3 is unit-less and represents 60% of the high-stage cooling output, 5 is unit-less and represents 100% of the high-stage cooling output, LCT is the low-stage cooling time interval in minutes during the previous cycle, and HCT is the high-stage cooling time interval in minutes during the previous cycle.

The following step, 142, queries whether the value CLR is less than 60. If it is, then in step 144 CLR is set to be equal to 60 and in the following step 150, LCdes is calculated as described below. If, on the other hand, step 142 determines that CLR is greater than or equal to 60, then in step 146 it is determined whether the value of CLR is greater than 100. If not, then in step 150, LCdes is calculated as described below. If on the other hand CLR is greater than 100 in step 146, then the value of CLR is set to 100 at step 148 before the calculation of step 150 is performed.

The value of 60 in steps 142 and 144 is determined by setting LCT=LCdes=20 minutes and solving Equation (1) assuming HCT=0, thus yielding the maximum load requirement that can be satisfied in low-stage cooling (CLR, low). On the other hand, if a cycle consists of 20 minutes of high-stage cooling with no low-stage cooling, Equation (1) leads to 100 as representing the minimum load requirement which can be satisfied with high-stage cooling (CLR, high). If a different value is used for the initial LCdes setting, the numbers used in steps 142, 144 and 146, 148 are adjusted accordingly. Between these two limits (CLR, low) and (CLR, high), the desired low-stage cooling time LCdes is determined in step 150.

At step 150, LCdes is calculated using the following equation:

$$LCdes = Int((100-CLR)/2) \qquad \text{Equation 2,}$$

where the function Int returns the nearest whole integer.

The system then returns to step 103 where it cycles waiting for a call for cooling from thermostat 10.

After the first cooling cycle is completed, CPU 40 computes the CLR using Equation (1) and compares the result to (CLR, low) and (CLR, high). If the CLR is less than (CLR, low), CPU 40 sets the CLR equal to (CLR, low) and calculates LCdes using Equation (2). If the CLR is greater than (CLR, low) but less than (CLR, high), CPU 40 calculates LCdes using Equation (2) without adjusting the CLR. If the CLR is greater than (CLR, high), CPU 40 sets the CLR equal to (CLR, high) and then calculates LCdes using Equation (2). After the first cycle, LCdes may be equal to zero in which case the next cycle is spent in high-stage cooling mode, or it may be greater than zero in which case the next cycle runs in low-stage cooling mode up to the length of time indicated by LCdes, with an additional high-stage cooling mode run if thermostat 10 is not satisfied within the LCdes time.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for selectively providing a low cooling mode and a high cooling mode of a cooling cycle in an air conditioning unit as a function of a previous cooling cycle, comprising the steps of:
   storing a previous duration of operation of a low cooling mode and a previous duration of operation of a high cooling mode of a previous cooling cycle;
   determining an existence of a cooling load to be satisfied;
   recalling the stored duration of the previous low cooling mode;
   providing a low cooling mode for a selected first time period dependent upon the stored duration of the previous low cooling mode; and
   terminating the low cooling mode if the cooling load is satisfied during the selected first time period.

2. The method of claim 1, further comprising the steps of:
   determining whether continuation of the cooling load still exists after the selected first time period of the low cooling mode;
   providing a high cooling mode if the cooling load continues until the cooling load is satisfied; and
   terminating the high cooling mode when the cooling load is satisfied.

3. The method of claim 1 wherein the selected first time period of the low cooling mode is greater than the stored duration of the previous low cooling mode when the stored duration of the previous high cooling mode is less than a predetermined amount of time.

4. The method of claim 1 wherein the selected first time period of the low cooling mode is less than the stored duration of the previous low cooling mode when the stored duration of the previous high cooling mode is greater than a predetermined amount of time.

5. The method of claim 1 wherein determination of the existing cooling load is performed by a single-stage thermostat.

6. The method of claim 1, wherein said air conditioning unit includes an air conditioning relay, said air conditioning relay is disabled, and determination of the existing cooling load is performed by a two-stage thermostat.

7. A method for selectively providing a low cooling mode and a high cooling mode of a cooling cycle in an air conditioning unit as a function of a previous cooling cycle, comprising the steps of:
   storing the duration of a previous cooling cycle;
   determining the existence of a cooling load to be satisfied;
   recalling the stored duration of the previous cooling cycle;
   providing a low cooling mode for a selected first time period dependent upon the time duration of the previous cooling cycle and the determination of the existing cooling load to be satisfied; and
   terminating the low cooling mode if the cooling load is satisfied during the selected first time period.

8. The method of claim 7, further comprising the steps of:
   determining whether continuation of the cooling load still exists after the selected first time period of the low cooling mode;
   providing a high cooling mode if the cooling load continues until the cooling load is satisfied; and
   terminating the high cooling mode when the cooling load is satisfied.

9. The method of claim 7 wherein determination of the existing cooling load is performed by a single-stage thermostat.

10. The method of claim 7, further comprising the step of:
    storing a previous time period of operation of a low cooling mode and a previous time period of operation of a high cooling mode of the previous cooling cycle;
    wherein the step of recalling includes recalling the stored time period of the previous high cooling mode; and
    wherein the step of providing the low cooling mode is further dependent upon the stored time period of the previous high cooling mode.

11. The method of claim 10, further comprising the steps of:
- determining whether continuation of the cooling load still exists after the selected first time period of the low cooling mode;
- providing a high cooling mode if the cooling load continues until the cooling load is satisfied; and
- terminating the high cooling mode when the cooling load is satisfied.

12. An adaptive control system for providing a low cooling mode and a high cooling mode of a cooling cycle in an air conditioning unit as a function of a previous cooling cycle, comprising:
- means for storing a previous duration of operation of a low cooling mode and a previous duration of operation of a high cooling mode of a previous cooling cycle;
- means for determining the existence of a cooling load to be satisfied;
- means for recalling the stored duration of the previous low cooling mode;
- means for providing a low cooling mode for a selected first time period dependent upon the stored duration of the previous low cooling mode; and
- means for terminating the low cooling mode if the cooling load is satisfied during the selected first time period.

13. The system of claim 12, wherein:
- the determining means determines whether continuation of the cooling load still exists after the selected first time period of the low cooling mode;
- the providing means further provides a high cooling mode if the cooling load continues until the cooling load is satisfied; and
- the terminating means terminates the high cooling mode when the cooling load is satisfied.

14. The system of claim 12 wherein:
- the storing means further stores the time at which the previous cooling cycle ended;
- the recalling means further recalls the previous cooling cycle end time; and
- the providing means provides the low cooling mode dependent upon the time duration of the previous cooling cycle and the determination of the existing cooling load to be satisfied.

15. The system of claim 12 wherein the determining means is a single-stage thermostat.

16. An adaptive control system for providing a low cooling mode and a high cooling mode of a cooling cycle in a furnace as a function of a previous cooling cycle, comprising:
- means for storing the duration of a previous cooling cycle;
- means for determining the existence of a cooling load to be satisfied;
- means for recalling the stored duration of the previous cooling cycle;
- means for providing a low cooling mode for a selected first time period dependent upon the duration of the previous cooling cycle and the determination of the existing cooling load to be satisfied; and
- means for terminating the low cooling mode if the cooling load is satisfied during the selected first time period.

17. The system of claim 16 wherein:
- the determining means determines whether continuation of the cooling load still exists after the selected first time period of the low cooling mode;
- the providing means further provides a high cooling mode if the cooling load continues until the cooling load is satisfied; and
- the terminating means terminates the high cooling mode when the cooling load is satisfied.

18. The system of claim 16 wherein the determining means is a single-stage thermostat.

19. The system of claim 16, wherein said furnace unit includes an air conditioning relay, said air conditioning relay is disabled, and determination of the existing cooling load is performed by a two-stage thermostat.

20. A method for providing a low cooling mode and a high cooling mode of a cooling cycle in a current cycle of an air conditioner unit as a function of the previous cooling cycle wherein the current cooling cycle is a function exclusively of time run in the low cooling mode and time run in the high cooling mode of said previous cooling cycle, comprising the steps of:
- determining an existence of a cooling load to be satisfied;
- running the unit in said low cooling mode for a first time interval that does not exceed a predetermined limit;
- running the unit in said high cooling mode for a second time interval until the cooling load is satisfied;
- calculating a cooling load requirement as a function of said first time interval and said second time interval; and
- predetermining the low cooling mode time limit for a next cycle from the calculated cooling load requirement.

21. The method of claim 20, further comprising the steps of:
- determining if the cooling load is satisfied while the unit is operating in low cooling mode;
- if the cooling load is satisfied, terminating the low cooling mode; and
- if the cooling load is satisfied in low cooling mode, aborting initiation of operation in high cooling mode.

22. The method of claim 20 wherein determining the existence of a cooling load to be satisfied is performed by a single-stage thermostat.

23. The method of claim 20 where the cooling load requirement to satisfy a call for cooling is calculated as $CLR=(3\times LCT)+(5\times HCT)$, where CLR is the cooling load requirement, LCT is the first time interval, in minutes, and HCT is the second interval, in minutes.

* * * * *